United States Patent Office 2,888,437
Patented May 26, 1959

2,888,437
CATALYST

Anthony F. Finelli, Akron, and Nelson V. Seeger, Cuyahoga Falls, Ohio, assignors to The Goodyear Tire & Rubber Company, Akron, Ohio, a corporation of Ohio No Drawing. Application November 20, 1956
Serial No. 623,308

4 Claims. (Cl. 260—75)

This invention relates to methods for preparing unvulcanized elastomeric polymers from diisocyanates and active-hydrogen-containing polymeric materials. More particularly it relates to methods for catalyzing the reaction between active-hydrogen-containing polymeric materials and certain diisocyanates.

By the term "active-hydrogen" used to describe the polymeric material is meant those hydrogen atoms which are reactive as measured and determined by the Zerewitinoff method. Examples of these active-hydrogen-containing polymeric materials are polyesters and polyalkylene ether glycols. The polyesters are prepared by the condensation of one or more glycols such as ethylene or propylene glycol with one or more dibasic carboxylic acids such as adipic acid. If desired, small amounts of bifunctional amino-bearing compounds such as amino carboxylic acids, amino alcohols or diamines may be employed along with the glycol and dibasic acid. Small amounts of trifunctional materials may also be employed in the preparation of the polyesters. The polyalkylene ether glycols, also termed hydroxyl-terminated polyethers, are derived from alkylene oxides or glycols or from heterocyclic ethers, such as dioxolane.

The unvulcanized elastomeric polymers, as described in United States Patents 2,625,531; 2,625,532; 2,625,535 and 2,760,953, are prepared from polyesters or polyesteramides of specified molecular weight and chemical composition with controlled amounts of designated diisocyanates. Similar synthetic polymers are prepared by reacting diisocyanates with polyalkylene ether glycols as described in United States Patents 2,692,873 and 2,702,797.

The polyesters and polyalkylene ether glycols used to form the unvulcanized elastomeric polymers are those having an average molecular weight of from approximately 1000 to 3000, an acid number not greater than 5, and an hydroxyl number from approximately 40 to 110. Particularly useful polymers are those prepared from polyalkylene ether glycols and polyesters having an acid number not greater than 2, a hydroxyl number of approximately 60, and a corresponding average molecular weight of approximately 1,900.

The unvulcanized elastomeric polymers are similar in physical properties to unvulcanized natural rubber and as such are mixed, subsequent to their preparation, with compounding ingredients and a curative which is usually a diisocyanate, a polyisocyanate or mixtures thereof. The fully compounded material is processed on conventional rubber fabricating equipment and cured to form useful rubber products.

The unvulcanized elastomeric polymers are prepared by heating the liquid polyester or polyalkylene ether glycol with a controlled amount of diisocyanate until the initial reaction has produced a relatively viscous liquid after which the liquid is poured into pans or molds and baked for extended periods of time at elevated temperatures to achieve in the polymer the desired plasticity for processing on conventional rubber fabricating equipment.

Among the various diisocyanates employed to prepare the unvulcanized polymers are the tolylene diisocyanates, particularly 2,4- and 2,6-tolylene diisocyanate, and 3,3'-dimethyl 4,4'-diphenyl diisocyanate prepared by phosgenating ortho-tolidine. These diisocyanates are relatively slow in reacting with the polyester or polyalkylene ether glycol when compared to such diisocyanates as 1,5 naphthalene diisocyanate and 4,4'-diphenyl diisocyanate. As a result, increased reaction times are necessary to achieve the desired plasticity in the unvulcanized polymer prepared from these relatively slow reacting diisocyanates.

It is, therefore, an object of this invention to provide a method for reducing the reaction time required to achieve the desired plasticity in the unvulcanized polymers prepared from the tolylene diisocyanates and 3,3'-dimethyl 4,4'-diphenyl diisocyanate. Another object is to provide a method for catalyzing the reaction between these diisocyanates and the polyesters or polyalkylene ether glycols to produce unvulcanized elastomeric polymers which are substantially gel-free and which have the plasticity properties required for satisfactory processing. Other objects will appear as the description proceeds.

The objects of this invention are accomplished by heating the polyester or polyalkylene ether glycol in the presence of magnesium oxide or barium oxide before the diisocyanate reactant is added. While the heating time and temperature can be varied to achieve the desired catalytic effect, it has been found that heating the polyester or polyalkylene ether glycol with the diisocyanate for from 30 to 60 minutes at a temperature of from 125 to 145° C. is particularly effective.

It has been observed that of the various metallic oxides tested only magnesium and barium oxide produce the desired catalytic effect. It has also been observed that the rate of reaction is not appreciably increased by heating the polyester or polyalkylene ether glycol without adding magnesium or barium oxide nor by adding the magnesium oxide or barium oxide to the diisocyanate and then adding both materials to the polyester. The desired catalysis is achieved only when the oxide is added to and heated with the polyester or polyalkylene ether glycol before the modifying diisocyanate is added to the reaction mixture.

Relatively small amounts of the catalytic oxide are employed in the practice of this invention. As little as 0.005 part and as much as 0.2 part by weight of the oxide per 100 parts by weight of the polyester or polyalkylene ether glycol produce the desired catalytic effect. A particularly effective amount has been found to be 0.02 part by weight of the oxide per 100 parts by weight of the active-hydrogen-containing material.

In preparing the unvulcanized elastomeric polymers from the active-hydrogen containing polymeric materials and the diisocyanate, approximately equal molecular amounts of the two reactants are employed. In general from 0.95 to 1.05 mols of diisocyanate per mol of polyester, for instance, produce modified polymers having the desired processing characteristics, with best results being observed when from 0.98 to 1.02 mols of diisocyanate per mol of polyester are employed. Softer polymers result when lesser amounts of diisocyanate are employed, and tougher, more cross-linked polymers are observed when larger amounts of diisocyanates are used.

The practice of this invention is further illustrated with respect to the following examples in which, unless otherwise indicated, parts are shown by weight. These examples are to be interpreted as representative rather than restrictive of the scope of this invention. The Mooney plasticity values reported represent results obtained using the large rotor at 212° F. Plastic flow data are reported in seconds required to extrude 1 inch of the polymer through an orifice at a temperature of 212° F. and under a pressure of 500 pounds per square inch.

*Example 1*

A polyester (2400 parts) prepared from the condensation reaction between approximately 80 mol percent of ethylene glycol, 20 mol percent of propylene glycol and adipic acid having a molecular weight of approximately 1900 (an acid number of 2.3 and a hydroxyl number of 56.4) was placed in a 4-liter pot equipped with a stirrer, a thermometer and a spindle for viscosity measurement. The polyester was heated to approximately 135° C. after which 0.48 part of magnesium oxide was added. Heating was continued in the temperature range of from 130 to 140° C. with gentle stirring. To this mixture was added 336.4 parts of 3,3'-dimethyl 4,4'-diphenyl diisocyanate. Heating was continued with viscosity measurements being taken periodically. After 11 minutes the viscosity had risen to 2700 centipoises at which point the mixture was poured onto a tray and placed in an oven heated to 248° F. Periodic plasticity checks were made on the reaction mixture. After 4 hours the Mooney plasticity of the reaction product was 56 and the plastic flow was 180.

Using the same ingredients and the same respective amounts thereof but with the elimination of magnesium oxide, the time required to obtain a viscosity of 2700 centipoises was 64 minutes. This mixture poured onto a tray and heated at 248° F. for 18 hours showed a plastic flow of 26 and was too soft for the determination of Mooney plasticity.

Following the same procedure as in Example 1 except that the magnesium oxide was added to the diisocyanate instead of to the polyester produced a reaction mixture reaching a viscosity of 2700 after 44 minutes. After 18 hours baking at 248° F., the plastic flow of the reaction mixture was 91.

*Example 2*

Using the same equipment as described in Example 1, 600 parts of a polyester having an average molecular weight of approximately 1800 (an acid number of 2.3 and a hydroxyl number of 59.5) and prepared from 80 mol percent of ethylene glycol, 20 mol percent of propylene glycol and adipic acid was heated to 135° C. Magnesium oxide (0.18 part) was added and the mixture heated for 50 minutes at 135–140° C. with gentle stirring. To this mixture was added 88.8 parts of 3,3'-dimethyl 4,4-diphenyl diisocyanate, heating and stirring was continued and after 12 minutes the viscosity of the reaction mixture was 2700 centipoises. The reaction mixture was then poured onto a tray and placed in an oven at 248° F. After 4 hours baking the plastic flow of the reaction mixture was 921.

The same reaction conducted without magnesium oxide being present required 71 minutes for the mixture of diisocyanate and polyester to achieve a viscosity of 2700 centipoises. This mixture, even after baking for 8 hours at 248° F., was still too soft for a plasticity measurement.

*Example 3*

Using the same equipment as described in Example 1, 600 parts of a polyester having an average molecular weight of approximately 1900 (an acid number of 0.4 and a hydroxyl number of 58.4) and prepared from 80 mol percent of ethylene glycol, 20 mol percent of propylene glycol and adipic acid was heated to 131° C. Barium oxide (1.0 part) was added and the mixture heated for 60 minutes at 131–140° C. with gentle stirring. To this mixture was added 80.3 parts of 3'3-dimethyl 4,4-diphenyl diisocyanate. Heating and stirring was continued and after 14 minutes the viscosity of the reaction mixture was greater than 3000 centipoises. The reaction mixture was then poured onto a tray and placed in an oven at 248° F. After 4 hours baking the plastic flow of the reaction mixture was 267.

The same reaction conducted without barium oxide being present required 3 hours for the mixture of diisocyanate and polyester to achieve a viscosity of 1800 centipoises. This mixture, even after baking for 16 hours at 248° F., was too soft for a plasticity measurement.

*Example 4*

A polyester (2400 parts) prepared from the condensation reaction between approximately 80 mol percent of ethylene glycol, 20 mol percent of propylene glycol and adipic acid having a molecular weight of approximately 1980 (an acid number of 1.5 and a hydroxyl number of 56.1) was placed in a 1-liter pot equipped with a stirrer, a thermometer and a spindle for viscosity measurement. The polyester was heated to approximately 136° C. after which 0.48 part of magnesium oxide was added. Heating was continued in the temperature range of from 130 to 140° C. with gentle stirring. To this mixture was added 220.2 parts of tolylene diisocyanate. Heating was continued with viscosity measurements being taken periodically. After 9 minutes the viscosity had risen to 2700 centipoises at which point the mixture was poured onto a tray and placed in an oven heated to 248° F. Periodic plasticity checks were made on the reaction mixture. After 6½ hours the Mooney plasticity of the reaction product was 40 and the plastic flow was 86.

Using the same ingredients with the elimination of magnesium oxide the time required to obtain a viscosity of 2700 centipoises was 108 minutes. This mixture was poured onto a tray and heated at 248° F. for 16 hours after which it was still too soft for plasticity determinations.

*Example 5*

A polybutylene glycol ether (2000 parts) having a molecular weight of approximately 3000 was placed in a 4-liter pot equipped with a stirrer, a thermometer and a spindle for viscosity measurement. This material is sold by the E. I. du Pont Co. as Teracol 30. The polybutylene glycol ether was heated to approximately 115° C. after which 0.40 part of magnesium oxide was added. Heating was continued in the temperature range of from 115 to 130° C. with gentle stirring. To this mixture was added 176.8 parts of 3,3'-dimethyl 4,4'-diphenyl diisocyanate. Heating was continued with viscosity measurements being taken periodically. After 50 minutes the mixture was poured onto a tray and placed in an oven heated to 248° F. Periodic plasticity checks were made on the reaction mixture. After 17 hours the Mooney plasticity of the reaction product was 73.

While certain representative embodiments and details have been shown for the purpose of illustrating the invention it will be apparent to those skilled in this art that various changes and modifications may be made therein without departing from the spirit or scope of the invention.

We claim:

1. The method of catalyzing the reaction between (A) a diisocyanate selected from the group consisting of tolylene diisocyanate and 3,3'-dimethyl 4,4'-diphenyl diisocyanate and (B) a material selected from the group consisting of polyalkylene ether glycols and hydroxyl-terminated polyesters, said polyesters being prepared from at least one dicarboxylic acid and at least one glycol, said material having a molecular weight ranging from 1000 to 3000 and an acid number not greater than 5 which comprises heating said material for from 30 to 60 minutes at a temperature of from approximately 125 to 145° C. in the presence of a catalyst selected from the group consisting of magnesium oxide and barium oxide and subsequently adding said diisocyanate to said material.

2. In the process of preparing an elastomeric diisocyanate-modified polymer from (A) a diisocyanate selected from the group consisting of tolylene diisocyanate and 3,3'-dimethyl 4,4'-diphenyl diisocyanate and (B) a material selected from the group consisting of polyalkylene ether glycols and hydroxyl-terminated polyesters, said polyesters being prepared from at least one dicarboxylic acid and at least one glycol, said material having a molecular weight ranging from 1000 to 3000 and an acid number not greater than 5 the improvement which comprises heating said material for from 30 to 60 minutes at a temperature of from approximately 125 to 145° C. with a catalyst selected from the group consisting of magnesium oxide and barium oxide and subsequently reacting said material with said diisocyanate.

3. The method for producing an elastomeric diisocyanate-modified polymer which comprises heating for from 30 to 60 minutes at a temperature of from approximately 125 to 145° C. (A) a material selected from the group consisting of polyalkylene ether glycols and hydroxyl-terminated polyesters, said polyesters being prepared from at least one dicarboxylic acid and at least one glycol, said material having a molecular weight ranging from 1000 to 3000 and an acid number not greater than 5 with (B) a catalyst selected from the group consisting of magnesium oxide and barium oxide and subsequently reacting said material with an approximately equal molecular amount of a diisocyanate selected from the group consisting of tolylene diisocyanate and 3,3'-dimethyl 4,4'-diphenyl diisocyanate.

4. The method defined by claim 3 in which the oxide catalyst is employed in an amount ranging from 0.005 to 0.20 part by weight per 100 parts by weight of said material.

References Cited in the file of this patent
UNITED STATES PATENTS

| | | |
|---|---|---|
| 2,729,618 | Muller et al. | Jan. 3, 1956 |
| 2,730,518 | Birley et al. | Jan. 10, 1956 |

FOREIGN PATENTS

| | | |
|---|---|---|
| 154,256 | Australia | Nov. 19, 1953 |
| 733,624 | Great Britain | July 13, 1955 |

UNITED STATES PATENT OFFICE
CERTIFICATE OF CORRECTION

May 26, 1959

Patent No. 2,888,437

Anthony F. Finelli et al

It is hereby certified that error appears in the printed specification of the above numbered patent requiring correction and that the said Letters Patent should read as corrected below.

Column 3, line 50, for "4,4-diphenyl" read -- 4,4'-diphenyl --; line 72, for "3'3-di-" read -- 3,3'-di- --; line 73, for "4,4-diphenyl" read -- 4,4'-diphenyl --.

Signed and sealed this 6th day of October 1959.

(SEAL)
Attest:

KARL H. AXLINE
Attesting Officer

ROBERT C. WATSON
Commissioner of Patents